US007838596B2

(12) United States Patent
Colhoun et al.

(10) Patent No.: US 7,838,596 B2
(45) Date of Patent: Nov. 23, 2010

(54) LATE ADDITION TO EFFECT COMPOSITIONAL MODIFICATIONS IN CONDENSATION POLYMERS

(75) Inventors: Frederick Leslie Colhoun, Kingsport, TN (US); Kenrick Lyle Venett, Blountville, TN (US); Bruce Roger DeBruin, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 873 days.

(21) Appl. No.: 11/500,800

(22) Filed: Aug. 8, 2006

(65) Prior Publication Data

US 2007/0066792 A1    Mar. 22, 2007

Related U.S. Application Data

(60) Provisional application No. 60/717,985, filed on Sep. 16, 2005.

(51) Int. Cl.
*C08F 297/04* (2006.01)

(52) U.S. Cl. .................. 525/54; 525/425; 525/437; 525/439; 525/444; 525/448; 528/302; 528/307; 528/308.1; 528/308.2; 528/308.3

(58) Field of Classification Search .............. 525/444, 525/53, 54, 418, 437, 439, 448; 264/176; 528/272, 302, 307, 308.1, 308.2, 308.3
See application file for complete search history.

(56) References Cited

U.S. PATENT DOCUMENTS

| 2,720,506 A | 10/1955 | Caldwell et al. |
| 2,808,390 A | 10/1957 | Caldwell |
| 2,965,613 A | 12/1960 | Milone et al. |
| 2,991,273 A | 4/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,148,172 A | 9/1964 | Fox |
| 3,153,008 A | 10/1964 | Fox |
| 3,264,255 A | 8/1966 | Taylor |
| 3,271,367 A | 9/1966 | Schnell et al. |
| 3,420,913 A | 1/1969 | Railsback |
| 3,451,971 A | 6/1969 | Lazarus |
| 3,533,973 A | 10/1970 | Stewart et al. |
| 3,538,045 A | 11/1970 | Stewart et al. |
| 3,624,040 A | 11/1971 | Rath et al. |
| 3,631,153 A | 12/1971 | Cater et al. |
| 3,693,960 A | 9/1972 | Golde et al. |
| 3,733,309 A | 5/1973 | Wyeth et al. |
| 3,867,349 A * | 2/1975 | Heeg et al. ................. 526/68 |
| 3,869,304 A | 3/1975 | Bogulslawski et al. |
| 3,892,798 A | 7/1975 | Heeg et al. |
| 4,087,482 A | 5/1978 | Shaffer |
| 4,093,593 A | 6/1978 | Go |
| 4,100,142 A | 7/1978 | Schaefer et al. |
| 4,107,149 A | 8/1978 | Bier et al. |
| 4,123,436 A | 10/1978 | Holub et al. |
| 4,124,566 A | 11/1978 | Saiki et al. |
| 4,159,301 A | 6/1979 | Buser et al. |
| 4,161,571 A | 7/1979 | Yasui et al. |
| 4,169,006 A | 9/1979 | Matsubara et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,260,735 A | 4/1981 | Bander et al. |
| 4,289,871 A | 9/1981 | Rowan et al. |
| 4,330,661 A | 5/1982 | Go |
| 4,343,922 A | 8/1982 | Shaffer |
| 4,357,461 A | 11/1982 | Go et al. |
| 4,401,804 A | 8/1983 | Wooten et al. |
| 4,408,004 A | 10/1983 | Pengilly |
| 4,420,581 A | 12/1983 | McFarlane et al. |
| 4,424,337 A | 1/1984 | Smith et al. |

(Continued)

FOREIGN PATENT DOCUMENTS

| AT | 259232 | 4/1965 |
| CN | 1392174 | 1/2003 |
| CN | 1482154 | 3/2004 |
| DE | 1950553 | 4/1970 |
| DE | 19841376 | 3/2000 |
| EP | 0578464 | 1/1994 |
| EP | 0581246 | 2/1994 |
| EP | 0699700 | 3/1996 |
| EP | 0541702 | 9/1996 |
| EP | 0465040 | 1/1997 |

(Continued)

OTHER PUBLICATIONS

Eastman, Eastpak polyesters: Extruding Film and Sheeting From Eastpak APET Polyester [online], accessed via the Internet [retrieved on Jun. 24, 2009], URL: <http://www.burchamintl.com/papers/petpapers/Eastman_7.pdf>.*

(Continued)

*Primary Examiner*—David Wu
*Assistant Examiner*—Robert Jones, Jr.
(74) *Attorney, Agent, or Firm*—Jennifer R. Knight; Bernard J. Graves, Jr.

(57) ABSTRACT

A process for preparing modified polymer by withdrawing a slip stream of polymer melt from the discharge line of a continuous polymerization reactor, admixing in a highly modified polymeric additive into the polymer melt within the slip stream, then introducing the modifier containing slip stream late in the manufacturing process prior to the slip stream withdrawal point. The improved processes of the invention have particular utility for large-scale, continuous reactor where transitions and short production runs are economically prohibitive thereby limiting the product breath. The process is particularly suited for producing a family of copolyesters using a continuous melt phase production process.

53 Claims, 3 Drawing Sheets

U.S. PATENT DOCUMENTS

| | | |
|---|---|---|
| 4,433,135 A | 2/1984 | Worley et al. |
| 4,434,276 A | 2/1984 | Horlbeck et al. |
| 4,440,924 A | 4/1984 | Kuze et al. |
| 4,447,595 A | 5/1984 | Smith et al. |
| 4,476,272 A | 10/1984 | Pengilly |
| 4,481,314 A | 11/1984 | Rule |
| 4,501,878 A | 2/1985 | Adams |
| 4,520,078 A | 5/1985 | Rabinowitz et al. |
| 4,535,118 A | 8/1985 | Pengilly |
| 4,551,368 A | 11/1985 | Smith et al. |
| 4,604,303 A | 8/1986 | Takakura et al. |
| 4,613,664 A | 9/1986 | Tate et al. |
| 4,617,374 A | 10/1986 | Pruett et al. |
| 4,619,987 A | 10/1986 | Saiki et al. |
| 4,647,650 A | 3/1987 | Sasaki et al. |
| 4,686,274 A | 8/1987 | Harris et al. |
| 4,702,963 A | 10/1987 | Phillips et al. |
| 4,704,417 A | 11/1987 | Bonin et al. |
| 4,705,844 A | 11/1987 | Espenschied et al. |
| 4,740,377 A | 4/1988 | Dawes et al. |
| 4,764,323 A | 8/1988 | Al Ghatta |
| 4,775,598 A | 10/1988 | Jaeckel |
| 4,806,696 A | 2/1989 | Job |
| 4,831,115 A | 5/1989 | Golba, Jr. et al. |
| 4,845,186 A | 7/1989 | Chujo et al. |
| 4,876,230 A | 10/1989 | Job |
| 4,906,693 A | 3/1990 | Craun et al. |
| 4,982,014 A | 1/1991 | Freitag et al. |
| 5,008,230 A | 4/1991 | Nichols |
| 5,010,162 A | 4/1991 | Serini et al. |
| 5,041,405 A | 8/1991 | Lunsford et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,114,570 A | 5/1992 | Nelson et al. |
| 5,124,301 A | 6/1992 | Wyness et al. |
| 5,220,140 A | 6/1993 | Ball et al. |
| 5,250,333 A | 10/1993 | McNeely et al. |
| 5,254,288 A | 10/1993 | Verheijen et al. |
| 5,258,233 A | 11/1993 | Mills et al. |
| 5,266,413 A | 11/1993 | Mills et al. |
| 5,296,587 A | 3/1994 | Sumner, Jr. et al. |
| 5,300,746 A | 4/1994 | Walters et al. |
| 5,310,977 A | 5/1994 | Stenkamp et al. |
| 5,317,066 A * | 5/1994 | Watanabe et al. ............ 525/425 |
| 5,318,797 A | 6/1994 | Egon et al. |
| 5,322,883 A | 6/1994 | Adyha et al. |
| 5,331,066 A | 7/1994 | Takanoo et al. |
| 5,340,884 A | 8/1994 | Mills et al. |
| 5,367,070 A | 11/1994 | Nath et al. |
| 5,372,864 A | 12/1994 | Weaver et al. |
| 5,376,702 A * | 12/1994 | Stibal et al. ................ 523/313 |
| 5,382,157 A | 1/1995 | Denis et al. |
| 5,384,337 A | 1/1995 | Weaver et al. |
| 5,384,377 A | 1/1995 | Weaver et al. |
| 5,393,871 A | 2/1995 | Yau et al. |
| 5,403,807 A | 4/1995 | Narula |
| 5,409,983 A | 4/1995 | Jones et al. |
| 5,410,984 A | 5/1995 | Pikus et al. |
| 5,419,936 A | 5/1995 | Tindale |
| 5,466,803 A | 11/1995 | Valerio et al. |
| 5,496,887 A | 3/1996 | Braune |
| 5,514,462 A | 5/1996 | Endo et al. |
| 5,519,112 A | 5/1996 | Harazoe et al. |
| 5,529,744 A | 6/1996 | Tindale |
| 5,573,820 A | 11/1996 | Harazoe et al. |
| 5,589,530 A | 12/1996 | Walsh |
| 5,593,740 A | 1/1997 | Strumban et al. |
| 5,608,027 A | 3/1997 | Crosby et al. |
| 5,610,231 A | 3/1997 | Braune |
| 5,646,208 A | 7/1997 | Cattron et al. |
| 5,648,032 A | 7/1997 | Nelson et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,718,860 A | 2/1998 | Lee et al. |
| 5,774,571 A | 6/1998 | Marshall |
| 5,830,544 A | 11/1998 | Kerscher et al. |
| 5,830,981 A | 11/1998 | Koreishi et al. |
| 5,837,786 A | 11/1998 | Miyoshi et al. |
| 5,851,668 A | 12/1998 | Sandor et al. |
| 5,874,515 A | 2/1999 | Huang et al. |
| 5,886,133 A | 3/1999 | Hilbert et al. |
| 5,898,058 A | 4/1999 | Nichols et al. |
| 5,906,882 A | 5/1999 | Valente et al. |
| 5,925,710 A | 7/1999 | Wu et al. |
| 5,940,022 A | 8/1999 | Takatsu |
| 5,945,460 A | 8/1999 | Ekart et al. |
| 5,962,608 A | 10/1999 | Ryang et al. |
| 5,976,450 A | 11/1999 | Mreijen |
| 5,998,004 A | 12/1999 | Nishino et al. |
| 6,020,419 A | 2/2000 | Bock et al. |
| 6,020,421 A | 2/2000 | Fukushima et al. |
| 6,022,920 A | 2/2000 | Maxwell et al. |
| 6,031,128 A | 2/2000 | Roh et al. |
| 6,034,202 A | 3/2000 | Aharoni et al. |
| 6,036,905 A | 3/2000 | Park et al. |
| 6,042,773 A | 3/2000 | Teramoto et al. |
| 6,063,827 A | 5/2000 | Sacripante et al. |
| 6,066,714 A | 5/2000 | Putzig et al. |
| 6,099,778 A | 8/2000 | Nelson et al. |
| 6,150,454 A | 11/2000 | Wu et al. |
| 6,156,867 A | 12/2000 | Aoyama et al. |
| 6,165,601 A | 12/2000 | Noda et al. |
| 6,166,170 A | 12/2000 | Putzig |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,261,656 B1 | 7/2001 | Semersky |
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,346,070 B1 | 2/2002 | Ohmatsuza et al. |
| 6,358,578 B1 | 3/2002 | Otto et al. |
| 6,365,659 B1 | 4/2002 | Aoyama et al. |
| 6,384,180 B1 | 5/2002 | Jernigan et al. |
| 6,417,320 B1 | 7/2002 | Otto et al. |
| 6,427,826 B1 | 8/2002 | Li et al. |
| 6,428,882 B1 | 8/2002 | Peiffer et al. |
| 6,441,129 B2 | 8/2002 | Duh |
| 6,451,959 B1 | 9/2002 | Ohmatsuzawa et al. |
| 6,465,098 B2 | 10/2002 | Mizuguchi et al. |
| 6,472,471 B2 | 10/2002 | Cooke et al. |
| 6,472,500 B2 | 10/2002 | Dhawan et al. |
| 6,473,024 B2 | 10/2002 | Toyoda et al. |
| 6,489,434 B2 | 12/2002 | Jen |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 | 1/2003 | Wu et al. |
| 6,541,598 B2 | 4/2003 | Duan et al. |
| 6,559,271 B2 | 5/2003 | Schaaf et al. |
| 6,569,479 B2 | 5/2003 | Rule |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,601,987 B2 | 8/2003 | Finder et al. |

| | | |
|---|---|---|
| 6,638,456 B2 | 10/2003 | Klein et al. |
| 6,649,731 B2 | 11/2003 | Hori et al. |
| 6,660,792 B2 | 12/2003 | Massey et al. |
| 6,664,413 B1 | 12/2003 | Cockrem |
| 6,710,158 B2 | 3/2004 | Edwards et al. |
| 6,716,904 B2 | 4/2004 | Takahashi |
| 6,727,306 B2 | 4/2004 | Edwards et al. |
| 6,733,873 B2 | 5/2004 | Mizutani et al. |
| 6,773,800 B2 | 8/2004 | Hosoe et al. |
| 6,774,204 B1 | 8/2004 | Putzig |
| 6,777,048 B2 | 8/2004 | Quillen |
| 6,780,916 B2 | 8/2004 | Tung et al. |
| 6,787,630 B1 | 9/2004 | Dominguez De Walter et al. |
| 6,797,401 B2 | 9/2004 | Herron |
| 6,803,082 B2 | 10/2004 | Nichols et al. |
| 6,827,897 B2 | 12/2004 | Hall et al. |
| 6,828,272 B2 | 12/2004 | Wiegner et al. |
| 6,852,388 B2 | 2/2005 | Murschall et al. |
| 6,887,947 B1 | 5/2005 | Schaefer et al. |
| 6,896,830 B2 | 5/2005 | Carlton et al. |
| 6,896,966 B2 | 5/2005 | Crawford et al. |
| 6,908,956 B2 | 6/2005 | Sutoris et al. |
| 6,953,768 B2 | 10/2005 | Wallace et al. |
| 7,300,967 B2 | 5/2006 | Xia |
| 7,138,478 B2 | 11/2006 | Kohlgruber et al. |
| 2002/0011694 A1 | 1/2002 | Nichols et al. |
| 2002/0014718 A1* | 2/2002 | Klein et al. ............... 264/176.1 |
| 2002/0032300 A1 | 3/2002 | Dowling et al. |
| 2002/0077443 A1 | 6/2002 | Nichols et al. |
| 2002/0087027 A1 | 7/2002 | Lindall et al. |
| 2002/0091226 A1 | 7/2002 | Nichols et al. |
| 2002/0094402 A1 | 7/2002 | Jen |
| 2002/0128427 A1 | 9/2002 | Schaaf et al. |
| 2002/0136808 A1 | 9/2002 | Rule |
| 2002/0137872 A1 | 9/2002 | Schneider et al. |
| 2002/0137879 A1 | 9/2002 | Ohmatsuzawa et al. |
| 2002/0156229 A1* | 10/2002 | Silva et al. ................... 528/176 |
| 2002/0193555 A1 | 12/2002 | Hori et al. |
| 2002/0198297 A1 | 12/2002 | Odorisio et al. |
| 2003/0018160 A1 | 1/2003 | Otto et al. |
| 2003/0040564 A1 | 2/2003 | Tung et al. |
| 2003/0045673 A1 | 3/2003 | Nakajima et al. |
| 2003/0083191 A1 | 5/2003 | Nakajima et al. |
| 2003/0108702 A1 | 6/2003 | Tung et al. |
| 2003/0144459 A1 | 7/2003 | Fujimori et al. |
| 2003/0216253 A1 | 11/2003 | Wiegner et al. |
| 2004/0023000 A1 | 2/2004 | Young et al. |
| 2004/0058805 A1 | 3/2004 | Nakajima et al. |
| 2004/0077486 A1 | 4/2004 | Bellamy et al. |
| 2004/0086733 A1 | 5/2004 | Fujimori et al. |
| 2004/0096609 A1 | 5/2004 | Nichols et al. |
| 2004/0101642 A1 | 5/2004 | Quillen et al. |
| 2004/0102316 A1 | 5/2004 | Wallace et al. |
| 2004/0106767 A1 | 6/2004 | Simon et al. |
| 2004/0127653 A1 | 7/2004 | Ellington et al. |
| 2004/0138057 A1 | 7/2004 | Wenzel |
| 2004/0178386 A1 | 9/2004 | Tung et al. |
| 2004/0180159 A1 | 9/2004 | Neal et al. |
| 2004/0180996 A1 | 9/2004 | Pearson et al. |
| 2004/0180997 A1 | 9/2004 | Pearson et al. |
| 2004/0185198 A1 | 9/2004 | Sisson et al. |
| 2004/0192813 A1 | 9/2004 | Pearson et al. |
| 2004/0224842 A1 | 11/2004 | Wallace et al. |
| 2004/0225103 A1 | 11/2004 | Kohlgrueber et al. |
| 2004/0225104 A1 | 11/2004 | Wiegner et al. |
| 2004/0230025 A1* | 11/2004 | DeBruin ...................... 528/271 |
| 2004/0236066 A1 | 11/2004 | Moore et al. |
| 2004/0241468 A1 | 12/2004 | Otaki |
| 2004/0249113 A1 | 12/2004 | Quillen et al. |
| 2005/0009941 A1 | 1/2005 | Sicken et al. |
| 2005/0107576 A1 | 5/2005 | Hori et al. |
| 2005/0153086 A1 | 7/2005 | Moore et al. |
| 2005/0187306 A1* | 8/2005 | Kulkarni ....................... 521/48 |
| 2005/0203267 A1 | 9/2005 | Jernigan et al. |
| 2005/0222345 A1 | 10/2005 | Nakayama et al. |
| 2006/0047103 A1 | 3/2006 | Armentrout |
| 2006/0223958 A1 | 10/2006 | Fischbuch |
| 2007/0066735 A1 | 3/2007 | Quillen et al. |
| 2007/0203279 A1 | 8/2007 | Jarvis et al. |

FOREIGN PATENT DOCUMENTS

| | | |
|---|---|---|
| EP | 0884365 | 12/1998 |
| EP | 0921144 | 6/1999 |
| EP | 1065230 | 1/2001 |
| EP | 1152035 | 11/2001 |
| EP | 1227117 | 7/2002 |
| EP | 1239006 | 9/2002 |
| EP | 1477506 | 11/2004 |
| EP | 1516892 | 3/2005 |
| EP | 1535944 | 6/2005 |
| EP | 1548046 | 6/2005 |
| GB | 673066 | 6/1952 |
| GB | 1 277 264 | 6/1972 |
| GB | 1337751 | 11/1973 |
| JP | 46-35500 | 10/1971 |
| JP | 46040713 | 12/1971 |
| JP | 46040714 | 12/1971 |
| JP | 46041025 | 12/1971 |
| JP | 46041033 | 12/1971 |
| JP | 47039497 | 11/1972 |
| JP | 47042989 | 12/1972 |
| JP | 48005798 | 1/1973 |
| JP | 48007272 | 3/1973 |
| JP | 48026955 | 4/1973 |
| JP | 48056782 | 8/1973 |
| JP | 48056783 | 8/1973 |
| JP | 48056784 | 8/1973 |
| JP | 48-79896 | 10/1973 |
| JP | 4879896 | 10/1973 |
| JP | 48031991 | 10/1973 |
| JP | 48079898 | 10/1973 |
| JP | 73035948 | 10/1973 |
| JP | 48038634 | 11/1973 |
| JP | 48038635 | 11/1973 |
| JP | 48038637 | 11/1973 |
| JP | 48044959 | 12/1973 |
| JP | 48099133 | 12/1973 |
| JP | 48102191 | 12/1973 |
| JP | 49005918 | 1/1974 |
| JP | 49010834 | 1/1974 |
| JP | 49006835 | 2/1974 |
| JP | 49006839 | 2/1974 |
| JP | 49009116 | 3/1974 |
| JP | 49045014 | 4/1974 |
| JP | 49045015 | 4/1974 |
| JP | 50-5735 B | 3/1975 |
| JP | 50-10196 B2 | 4/1975 |
| JP | 50039711 | 4/1975 |
| JP | 51042795 | 4/1976 |
| JP | 51127195 | 11/1976 |
| JP | 51145594 | 12/1976 |
| JP | 52-039790 | 3/1977 |
| JP | 52123489 | 10/1977 |
| JP | 52129798 | 10/1977 |
| JP | 52129799 | 10/1977 |
| JP | 53051294 | 5/1978 |
| JP | 53051295 | 5/1978 |
| JP | 53052595 | 5/1978 |
| JP | 53105591 | 9/1978 |
| JP | 54135896 | 10/1979 |
| JP | 54163996 | 12/1979 |
| JP | 55089332 | 7/1980 |
| JP | 55115425 | 9/1980 |
| JP | 55149320 | 11/1980 |
| JP | 56008431 | 1/1981 |

| | | | | | | |
|---|---|---|---|---|---|---|
| JP | 56-149423 | 11/1981 | | JP | 2003268628 | 9/2003 |
| JP | 57038609 | 8/1982 | | JP | 2003301038 | 10/2003 |
| JP | 58109532 | 6/1983 | | JP | 2003301090 | 10/2003 |
| JP | 59-015427 | 1/1984 | | JP | 2003301093 | 10/2003 |
| JP | 60-31526 | 2/1985 | | JP | 2003306536 | 10/2003 |
| JP | 60139750 | 7/1985 | | JP | 2003306538 | 10/2003 |
| JP | 60-151826 | 8/1985 | | JP | 2003306541 | 10/2003 |
| JP | 60202148 | 10/1985 | | JP | 2003306601 | 10/2003 |
| JP | 60219226 | 11/1985 | | JP | 2004035659 | 2/2004 |
| JP | 61-278558 | 12/1986 | | JP | 2004035660 | 2/2004 |
| JP | 61-291650 | 12/1986 | | JP | 2004067733 | 3/2004 |
| JP | 62-039208 | 2/1987 | | JP | 2004149790 | 5/2004 |
| JP | 62152715 | 7/1987 | | JP | 2004156055 | 6/2004 |
| JP | 62161827 | 7/1987 | | JP | 2004197088 | 7/2004 |
| JP | 62-177035 | 8/1987 | | JP | 2004204138 | 7/2004 |
| JP | 62207337 | 9/1987 | | JP | 2004224858 | 8/2004 |
| JP | 62297318 | 12/1987 | | JP | 2004256633 | 9/2004 |
| JP | 63-264661 | 11/1988 | | JP | 2004323627 | 11/2004 |
| JP | 63-315604 | 12/1988 | | JP | 2005023160 | 1/2005 |
| JP | 62-182065 | 1/1989 | | JP | 2005047960 | 2/2005 |
| JP | 22-14734 | 8/1990 | | JP | 2005047961 | 2/2005 |
| JP | 3146707 | 6/1991 | | JP | 2005047962 | 2/2005 |
| JP | 3161509 | 7/1991 | | JP | 2005187556 | 7/2005 |
| JP | 3292323 | 12/1991 | | JP | 2005187557 | 7/2005 |
| JP | 4370142 | 12/1992 | | JP | 2005187558 | 7/2005 |
| JP | 5097990 | 4/1993 | | JP | 2005187559 | 7/2005 |
| JP | 5-117379 | 5/1993 | | JP | 2005187560 | 7/2005 |
| JP | 5-287067 | 11/1993 | | JP | 2005187561 | 7/2005 |
| JP | 6087953 | 3/1994 | | JP | 2005213292 | 8/2005 |
| JP | 06-184333 | 7/1994 | | JP | 2005213293 | 8/2005 |
| JP | 62-71949 | 9/1994 | | JP | 2005220234 | 8/2005 |
| JP | 1994271494 | 9/1994 | | JP | 2005213291 | 11/2005 |
| JP | 62-79599 | 10/1994 | | KR | 19930003713 | 5/1993 |
| JP | 6286088 | 10/1994 | | KR | 120831 | 7/1995 |
| JP | 1994306154 | 11/1994 | | KR | 1997-0007952 | 5/1997 |
| JP | 7133412 | 5/1995 | | KR | 2001089942 | 10/2001 |
| JP | 7224218 | 8/1995 | | NL | 7113206 | 3/1972 |
| JP | 72-68188 | 10/1995 | | SU | 374343 | 7/1973 |
| JP | 1995268188 | 10/1995 | | WO | 96/03163 | 2/1996 |
| JP | 1996003301 | 1/1996 | | WO | 97/44376 | 11/1997 |
| JP | 1996283398 | 10/1996 | | WO | 98/41559 | 9/1998 |
| JP | 8325364 | 12/1996 | | WO | 99/57173 | 11/1999 |
| JP | 1997040850 | 2/1997 | | WO | 01/14452 | 3/2001 |
| JP | 9176464 | 7/1997 | | WO | 01/21680 | 3/2001 |
| JP | 9176465 | 7/1997 | | WO | 01/46306 | 6/2001 |
| JP | 9183892 | 7/1997 | | WO | 01/47688 | 7/2001 |
| JP | 9-256220 | 9/1997 | | WO | WO 01/90453 A1 | 11/2001 |
| JP | 9272793 | 10/1997 | | WO | 02/18472 | 3/2002 |
| JP | 10316765 | 12/1998 | | WO | 02/051616 | 7/2002 |
| JP | 11005892 | 1/1999 | | WO | 02/068497 | 9/2002 |
| JP | 1999071106 | 3/1999 | | WO | 02/72665 | 9/2002 |
| JP | 1999152324 | 6/1999 | | WO | 2004/065452 | 8/2004 |
| JP | 11-181067 | 7/1999 | | WO | 2004/074365 | 9/2004 |
| JP | 1999236440 | 8/1999 | | WO | 2004/078825 | 9/2004 |
| JP | 2000128970 | 5/2000 | | WO | 2004/101645 | 11/2004 |
| JP | 2000128971 | 5/2000 | | WO | 2005/068531 | 7/2005 |
| JP | 2000129102 | 5/2000 | | WO | 2005/075539 | 8/2005 |
| JP | 2000226446 | 8/2000 | | WO | 2005/082527 | 9/2005 |
| JP | 2000302854 | 10/2000 | | WO | 2005/095516 | 10/2005 |
| JP | 2001126639 | 1/2001 | | WO | 03/010226 | 2/2006 |
| JP | 2001163964 | 6/2001 | | | | |
| JP | 2001262016 | 9/2001 | | | | |
| JP | 2002249648 | 9/2002 | | | | |
| JP | 2002249653 | 9/2002 | | | | |
| JP | 2002322254 | 11/2002 | | | | |
| JP | 2002322258 | 11/2002 | | | | |
| JP | 2002332337 | 11/2002 | | | | |
| JP | 2003040992 | 2/2003 | | | | |
| JP | 2003113230 | 4/2003 | | | | |
| JP | 2003113232 | 4/2003 | | | | |
| JP | 2003171454 | 6/2003 | | | | |
| JP | 2003171455 | 6/2003 | | | | |
| JP | 2003268093 | 9/2003 | | | | |

OTHER PUBLICATIONS

Billmeyer Jr., Fred; "Methods of Estimating Intrinsic Viscosity," Journal of Polymer Science, 1949, pp. 83-86, vol. IV.

Notification of Transmittal of the International Search Report and the International Search Report and the Written Opinion of the International Searching Authority, or the Declaration date of mailing Jan. 15, 2007 on corresponding PCT application.

International Search Report and the Written Opinion of the International Searching Authority for corresponding PCT application PCT/US2006/34551.

International Search Report and the Written Opinion of the International Searching Authority for PCT application PCT/US2006/34524.
Co-pending U.S. Appl. No. 11/500,862, filed Aug. 8, 2006.
Office Action Dated Sep. 29, 2008, in copending U.S. Appl. No. 11/500,862.
Office Action Dated Apr. 2, 2009, in copending U.S. Appl. No. 11/500,862.
*Plastic Additives Handbook*, 5th Ed., 2001, pp. 123-136, Hanser Gardner Publications.
Kamatani et al., Effect of Phosphoric Acid on the POlycondensation of Bis(2-hydroxyethyl) Terephthalate Catalyzed by Sb(III) Compounds; Polymer Journal, 1979, pp. 125-130; vol. 12, No. 2.
Carl W. Fuller, Colored Iron Oxide Pigments, *Synthetic Pigment Handbook*, 1973, pp. 323-349, vol. 1, John Wiley and Sons, New York.
Fred W. Billmeyer, Jr., Principles of Color Technology, *Describing Color*, 1981, pp. 25-66, John Wiley and Sons, New York.
Kirk Othmer, Titanium and Titanium Alloys, *Encyclopedia of Chemical Technology*, vol. 24, 4th Ed., 1997, pp. 186-224; 225-349 and 801.
Louis E. Toth, Transition Metal Carbide and Nitrides, General Properties, Preparation and Characterization, 1971, p. 1-28, Academic Press, New York.
Kirk Othmer, *Encyclopedia of Chemical Technology*, vol. 17, 4th Ed., 1996, pp. 108-127.
Kirk Othmer, *Encyclopedia of Chemical Technology*, vol. 4, 4th Ed., 1992, pp. 841-848.
Kirk Othmer, *Encyclopedia of Chemical Technology*, vol. 4, 4th Ed., 1997, pp. 423-430.
Kirk Othmer, *Encyclopedia of Chemical Technology*, vol. 25, 4th Ed., 1998, pp. 872-873.
Kirk Othmer, *Encyclopedia of Chemical Technology*, vol. 23, 4th Ed., 1997, p. 676.
Kirk Othmer, *Encyclopedia of Chemical Technology*, vol., 6, 4th Ed., 1998, pp. 228-311.
Kirk Othmer, *Encyclopedia of Chemical Technology*, vol. 14., 4th Ed., 1998, pp. 829-902.
Kirk Othmer, *Encyclopedia of Chemical Technology*, vol. 17, 4th Ed., 1998, pp. 1-42; 43-67.
Kirk Othmer, *Encyclopedia of Chemical Technology*, vol. 12, 4th Ed., 1998, pp. 863-881.
Kirk Othmer, *Encyclopedia of Chemical Technology*, vol. 22, 4th Ed., 1997, pp. 256-278.
Kirk Othmer, *Encyclopedia of Chemical Technology*, vol. 16, 4th Ed., pp. 925-962.
D.C. Allport and A.A. Mohajer, *Block Copolymers*, 1973, pp. 264-270, John Wiley and Sons, New York.
M.E. Stewart, A.J. Cox, D.M. Naylor, Reactive Processing of Poly(ethylene 2,6-naphthalene dicarboxylate)/poly(ethylene terephthalate) Blends, *Polymer*, 1993, pp. 4060-4067, vol. 34, No. 19; Butterworth-Heinemann Ltd.
Liu et al., Improving Oxygen Barrier Properties of Poly(ethylene terephthlate) by Incorporating Isophthalate. I. Effect of Orientation, *Journal of Applied Science*, Nov. 15, 2005, 98(4), pp. 1615-1628, Wiley Periodicals, Inc.
A. Boehm and A. Glaser, The Quaterrylimides-Highly Efficient NIR Absorbers for Plastics, ANTEC paper 2004, Chicago, IL, May 2004.
Wu, S., A Generalized Criterion for Rubber Toughening: The Critical Matrix Ligament Thickness, *Journal of Applied Polymer Science*, vol. 35, pp. 549-561, 1988, John Wiley and Sons.
Weissmann, Mariana, et al.; "Theoretical Study of carbon-Coated Iron Nanowires"; *Physical Review B 70*, 201401-1 through 201401-4; 2004; The American Physical Society.
Zhang, Z.D. et al.; "Shell/Core Structure and Magnetic Properties of Carbon-Coated Fe-Co© Nanocapsules"; *Journal of Physics: Condensed Matter 13*; 1921-1929; 2001; Institute of Physics Publishing Ltd.
*Encyclopedia of Chemical Technology*; 4th Ed; vol. 4; pp. 1015-1037; John Wiley and Sons, New York.
Pierson, H.O.; *Handbook of Carbon, Graphite, Diamond and Fullerenes: Properties and Applications*; pp. 122-140; Noyes Publications; 1993.
Love, Charles H., (Retired), *Colored Iron Oxide Pigments, Natural*; pp. 323-332, John Wiley & Sons, New York, 1973.

Research Disclosure 39771; Anonymous; May 1997.
Co-pending U.S. Appl. No. 11/495,431 filed Jul. 28, 2006 (Eastman reference 80295).
Co-pending U.S. Appl. No. 11/154,208 filed Jun. 16, 2005 (Eastman reference 80182).
Co-pending U.S. Appl. No. 11/229,367 filed Sep. 16, 2005.
Co-pending U.S. Appl. No. 11/229,238 filed Sep. 16, 2005.
Office action dated May 14, 2007 from co-pending U.S. Appl. No. 11/229,367.
Office Action dated Jan. 25, 2008, in co-pending U.S. Appl. No. 11/229,367.
Office Action dated May 15, 2008, in co-pending U.S. Appl. No. 11/229,367.
Notice of Allowance dated Nov. 7, 2008 in co-pending U.S. Appl. No. 11/229,367.
Notice of Allowance dated Dec. 30, 2008 in co-pending U.S. Appl. No. 11/229,367.
Office Action dated Apr. 6, 2009, in co-pending U.S. Appl. No. 11/229,367.
Office Action dated Apr. 29, 2008, in co-pending U.S. Appl. No. 11/229,238.
Office Action dated Dec. 18, 2008, in co-pending U.S. Appl. No. 11/229,238.
Office Action dated Jun. 23, 2009, in co-pending U.S. Appl. No. 11/229,238.
Office Action dated Jun. 9, 2008, in co-pending U.S. Appl. No. 11/495,431.
Office Action dated Dec. 15, 2008, in co-pending U.S. Appl. No. 11/495,431.
Office Action dated Jun. 4, 2009, in co-pending U.S. Appl. No. 11/495,431.
Office Action dated Aug. 6, 2008, in co-pending U.S. Appl. No. 11/154,208.
Office Action dated Jan. 12, 2009, in co-pending U.S. Appl. No.11/154,208.
Office Action dated Jul. 2, 2009, in co-pending U.S. Appl. No. 11/154,208.
Office Action dated Feb. 5, 2010 in co-pending U.S. Appl. No. 11/154,208.
Office Action dated Dec. 30, 2009 in co-pending U.S. Appl. No. 11/495,431.
Office Action dated Nov. 9, 2009, in co-pending U.S. Appl. No. 11/154,208.
Office Action dated Jan. 26, 2010, in co-pending U.S. Appl. No. 11/229,238.
Notice of Allowance dated Aug. 4, 2009 in co-pending U.S. Appl. No. 11/229,367.
Notice of Allowance dated Dec. 18, 2009 in co-pending U.S. Appl. No. 11/229,367.
Co-pending U.S. Appl. No. 12/611,380 filed Nov. 3, 2009.
Office Action dated Dec. 16, 2009 in co-pending U.S. Appl. No. 12/611,380.
Office Action dated Apr. 7, 2010 in co-pending U.S. Appl. No. 12/611,380.
Office action dated Aug. 2, 2006 from co-pending U.S. Appl. No. 11/229,367.
Office action dated Jan. 18, 2007 from co-pending U.S. Appl. No. 11/229,367.
International Search Report from co-pending U.S. Appl. No. 11/154,208.
International Search Report from co-pending U.S. Appl. No. 11/229,367.
Terekhova et al., Blocking of Terminal Groups of Polyethylene Terephthalate with o-Phosphoric Acid; Science and Technology: Synthetic Fibers, pp. 1-5; No. 2.
Kirk Othmer, *Encyclopedia of Chemical Technology*, vol. 24, 4th Ed., 1998, pp. 572-602.
Terekhova et al., Heat Stability of Polyethylene Terephthalate (PET) Containing Phosphoric Esters, Khimicheskie Volokna, 1964, No. 4, pp. 1-6, All-Union Scientific Research Institute of Fibers.
Hans Meerwein and Theodor Bersin, Investigations of Metal Alcoholates and Ortho Acid Esters, Annalen der Chemie, Chemical Insitute of Marburg University, 1929, pp. 113-150, vol. 454765.

Hans Meerwein, Increase in Ionization Capacity of Weak Electrolytes as a Result of Complex Formation and its Significance for Catalytic Processes, Annalen der Chemie, Chemical Insitute of Konigsberg University, 1927, pp. 222-253, vol. 455.

International Search Report and the Written Opinion of the International Searching Authority for PCT Application PCT/US2006/34543.

International Search Report and the Written Opinion of the International Searching Authority for PCT Application PCT/US2006/34616.

Notice of Allowance dated May 18, 2010 for copending U.S. Appl. No. 11/495,431.

* cited by examiner

LATE ADDITION TO EFFECT COMPOSITIONAL MODIFICATIONS IN CONDENSATION POLYMERS

CROSS-REFERENCE TO RELATED APPLICATIONS

This application claims priority to U.S. Provisional Application Ser. No. 60/717,985, filed Sep. 16, 2005, the disclosure of which is incorporated herein by this reference.

FIELD OF THE INVENTION

The present invention relates to the preparation of a modified polymer by incorporating a compositional modifier into a slip stream of a continuously discharged polymer melt stream to produce a modified slip stream followed by reintroduction of the modified slip stream into the polymer melt prior to the slipstream withdrawal point. More particularly, the invention relates the preparation of condensation type copolyesters by withdrawing a slip stream of an unmodified- or slightly-modified polyester melt exiting a continuous polymerization reactor, incorporating a highly-modified polymer into the slip stream, then reintroducing the modified slip stream into the continuous polymerization reactor to produce a copolymer of intermediate comonomer content.

BACKGROUND OF THE INVENTION

Condensation polymers such as thermoplastic polyesters, polycarbonates, and polyamides have many desirable physical and chemical attributes that make them useful for a wide variety of molded, fiber, and film applications. However, for specific applications, these polymers also exhibit limitations that must be minimized or eliminated. To overcome these limitations, polymers are frequently made containing one or more additives or comonomers depending upon the desired end use of the polymer. For example, in the case of polyester polymers, it is common to incorporate one or more ultraviolet absorbers, particles for improving the reheat of bottle preforms made from the polyester polymer, toners or pigments or colored particles, acetaldehyde scavengers or inhibitors, catalyst deactivators or stabilizers, oxygen barrier material, friction reducing aids, crystallization aids, impact modifiers, and so forth.

One of the most common thermoplastic polyester polymers is polyethylene terephthalate (PET). PET polymer is used extensively in the packaging industry, especially in the production of bottles for carbonated and non-carbonated beverages. In the carbonated beverage industry, concerns include the rate of carbon dioxide escape from the container, taste deterioration of the contents due to degradation by light, and extraction of additives added either during melt polymerization or subsequent melt processing required to fabricate the container. To overcome these problems, PET resins are often modified by incorporating unique comonomers into the polymer backbone thus producing a wide variety of PET copolyesters.

Several techniques have been employed to produce PET copolyesters. In conventional polyester manufacturing, copolyesters are typically produced by two different routes: ester exchange plus polycondensation (the DMT process) or direct esterification plus polycondensation (the direct esterification process.) In the older ester exchange process, or DMT process, dimethyl terephthalate (DMT), ethylene glycol (EG), and the modifying comonomers are typically combined at the beginning of the manufacturing process in the paste tank or first esterification reactor; the modifying comonomer can be added as either a diacid, a dialkyl ester derivative of the acid, or a diol. In the presence of a catalyst at atmospheric pressure and at a temperature from about 180° C. to 230° C., these components undergo ester interchange to yield the intermediate bis(hydroxyethyl ester) substituted monomer of the acids and methanol.

The reaction is reversible and is carried to completion by removing the methanol. After completion of the ester exchange, a stabilizer may then be added to deactivate the ester exchange catalyst and a polycondensation catalyst is then added. The intermediate monomers are then polymerized by a polycondensation reaction, where the temperature is raised to about 265° C. to about 305° C. and the pressure is reduced to below 2 mm of mercury vacuum in the presence of a suitable polymerization catalyst (e.g. antimony). From this reaction, polyethylene terephthalate copolymer and ethylene glycol are formed. Because the reaction is reversible, the glycol is removed as it is evolved, thus forcing the reaction toward the formation of the polyester.

The second method, or direct ester exchange process, is a well known variation of the DMT process and utilizes purified terephthalic acid (PTA) instead of DMT. In the first step, PTA is combined with ethylene glycol (EG) and either diacids or diols of the modifying comonomers. Typically reacted without any catalyst and at a pressure from about 5 psia to 85 psia and at a temperature from about 155° C. to 305° C., these components undergo direct esterification to yield bis(hydroxyalkyl) substituted intermediate monomers of the acids and water. After the completion of the direct esterification, the intermediate monomers are then polymerized by the polycondensation reaction as described in the ester interchange process. That is, the intermediate monomers are then polymerized by raising the temperature to about 265° C. to about 305° C. and the pressure is reduced to below 2 mm of mercury vacuum in the presence of a suitable polymerization catalyst (e.g. antimony). From this reaction, polyethylene terephthalate copolymer and ethylene glycol are formed. Because the reaction is reversible, the glycol is removed as it is evolved, thus forcing the reaction toward the formation of the polyester.

With the increased availability of purified terephthalic acid, the newer direct esterification offers many advantages including conversion from a batch process to a continuous process. Continuous processes are cost effective to operate when relatively large amounts of polyester or copolymer are required. However, other problems occur relating to the use of the continuous process to make copolyester when relatively small amounts of copolyester are required and/or a family of copolyesters with varying comonomer content is desired. In particular, a residence time on the order of 4-to-12 hours is typical for a continuous polymerization process; therefore, any changes in polymer compositions will generate significant amounts of off-class material. Problems associated with off-class are further exacerbated at higher production rates on larger scale manufacturing lines making such equipment ill-suited for small-scale production of a diverse family of modified thermoplastics resins containing varying compositions.

Several post-polymerization processes have also been utilized to produce PET copolyesters. One approach has been to melt blend a PET base polymer with a second, condensation type polymer using an extruder or reaction vessel, allowing the two polymers to undergo transesterification, thereby producing a random copolymer. This process exhibits several shortcomings. First, extended reaction times up to ⅓ to two hours are required to achieve melt randomization thereby leading to thermal degradation of the polymers and concurrent loss in physical properties, generation of color, and production of other undesirable degradation products such as acetaldehyde. Second, additional equipment either in the form of large-scale, heated vessels or extruders are required to provide the extended melt residence time. Third, additional catalysts can be incorporated to facilitate tranesterification thereby reducing the melt residence time; however the additional catalysts will negatively impact both the color and thermal stability of the resultant homogenized copolymer. Lastly and most important, this process does not capture the economic advantages associated with large-scale continuous polyester manufacturing processes.

Another post-polymerization process to prepare copolyesters comprises merging two reactor melt streams together wherein a melt stream of highly modified copolyester is feed into the discharge line of continuously polymerized polyester of low or no modification and subjecting the resins to static mixing and dynamic mixing in the discharge line. A variant of this method involves withdrawing a side steam from the discharge line of the continuously produced PET base resin, sending the side stream to an kneading extruder, introducing the highly-modified copolyester into the kneading extruder, returning the modified side stream to the discharge line of the continuously produced PET base resin, then subjecting the resins to static mixing and dynamic mixing in the discharge line. Although the combination of static and dynamic mixing of these approaches likely improves the distributive mixing of these two components, it does not provide sufficient time to enable reactive randomization via transesterification of the two polyesters. Furthermore, the addition of static and dynamic mixing units in the transport lines of a large-scale, continuous polymerization have the disadvantage in that they require extensive cleaning between product transitions, limiting their utility for agile production of a portfolio polyester products.

In light of the above, there exists a need for a method to effect more rapid compositional changes during product transitions with generation of less off-class material in the production of copolyester resins by melt phase polymerization, particularly in relation to large-scale, continuous plants designed to produce such polyesters. Thus, there is a desire to provide a method for adding a modifying polymer to a polymer melt stream in a manner which allows time for good mixing and chemical equilibration.

BRIEF SUMMARY OF THE INVENTION

The present invention discloses a process for preparing a modified polymer by:
  a) discharging from a polymerization reactor a polycondensed polymer melt to form a continuously discharged polymer melt stream,
  b) withdrawing a portion of the polymer melt from the continuously discharged polymer melt stream to form a slipstream,
  c) introducing a compositional modifier into the slipstream to form a modifier containing slipstream, and
  d) introducing the modifier containing slipstream to a location upstream from the point of withdrawing the polymer melt from the discharged polymer melt stream in step b).

The improved processes of the invention have particular utility for large-scale, continuous reactor where transitions and short production runs are economically prohibitive thereby limiting the product breath. The process is particularly suited for producing a family of copolyesters using a continuous melt phase production process. These and other aspects of the present invention will become apparent from the following description.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
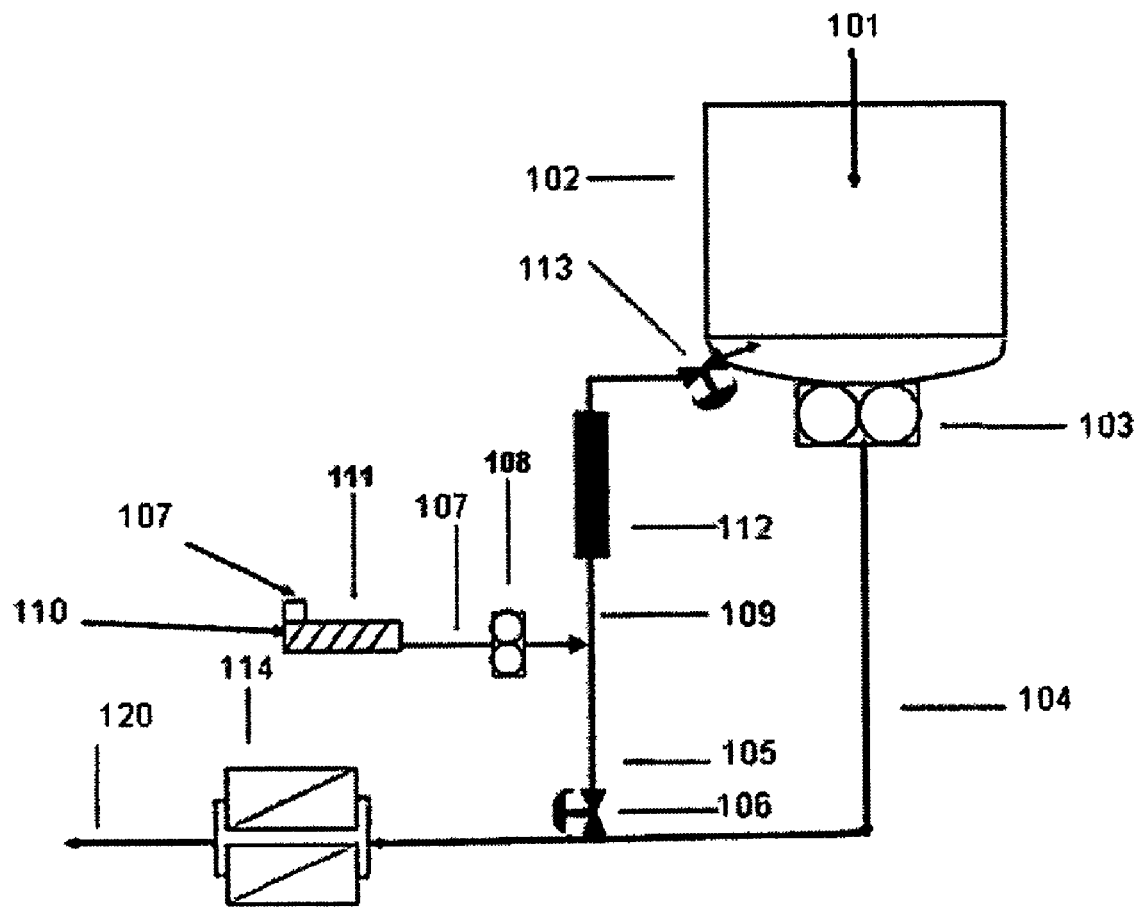
FIG. 1 is a process flow diagram illustrating a slipstream to which is fed a compositional modifier through an extruder.
Figure 2:
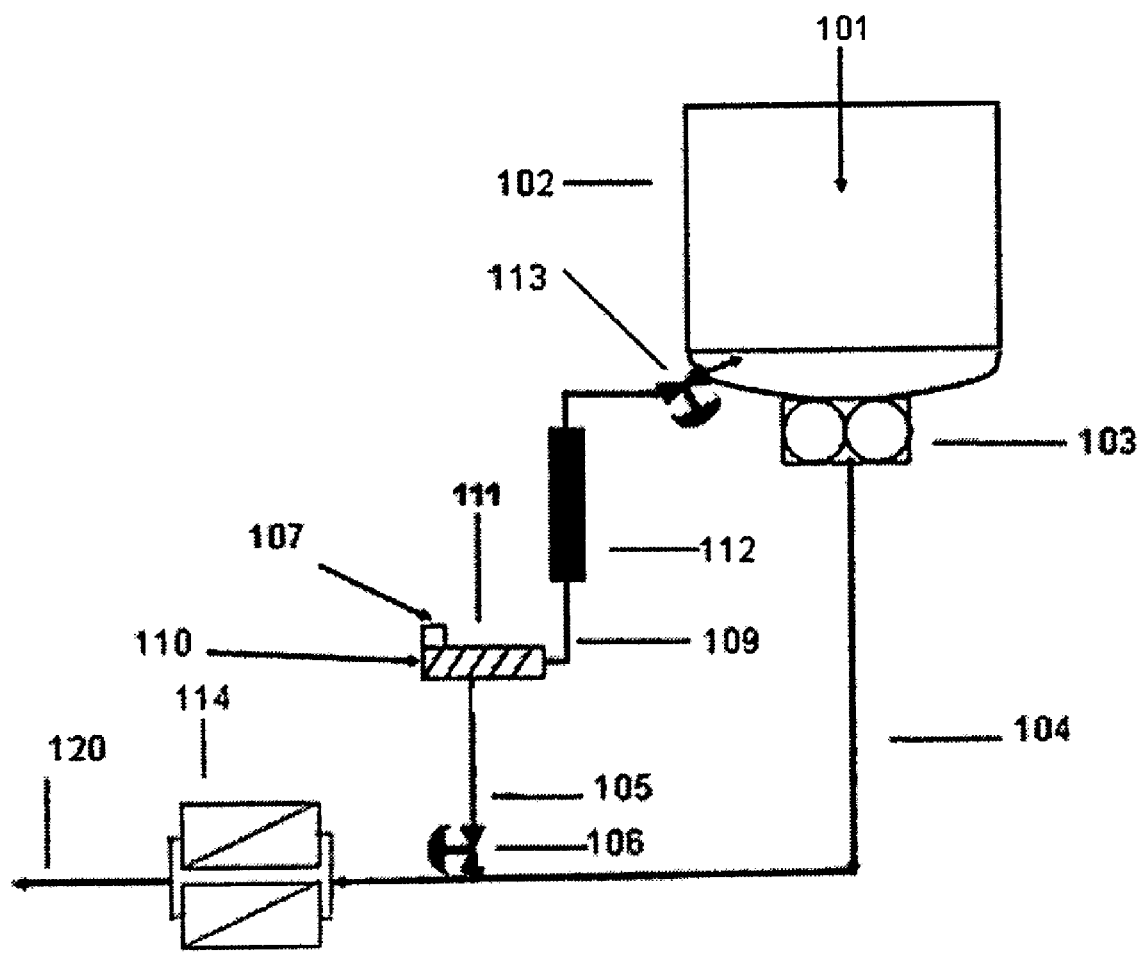
FIG. 2 is a process flow diagram illustrating a slipstream to which is fed a compositional modifier through an in-line extruder
Figure 3:
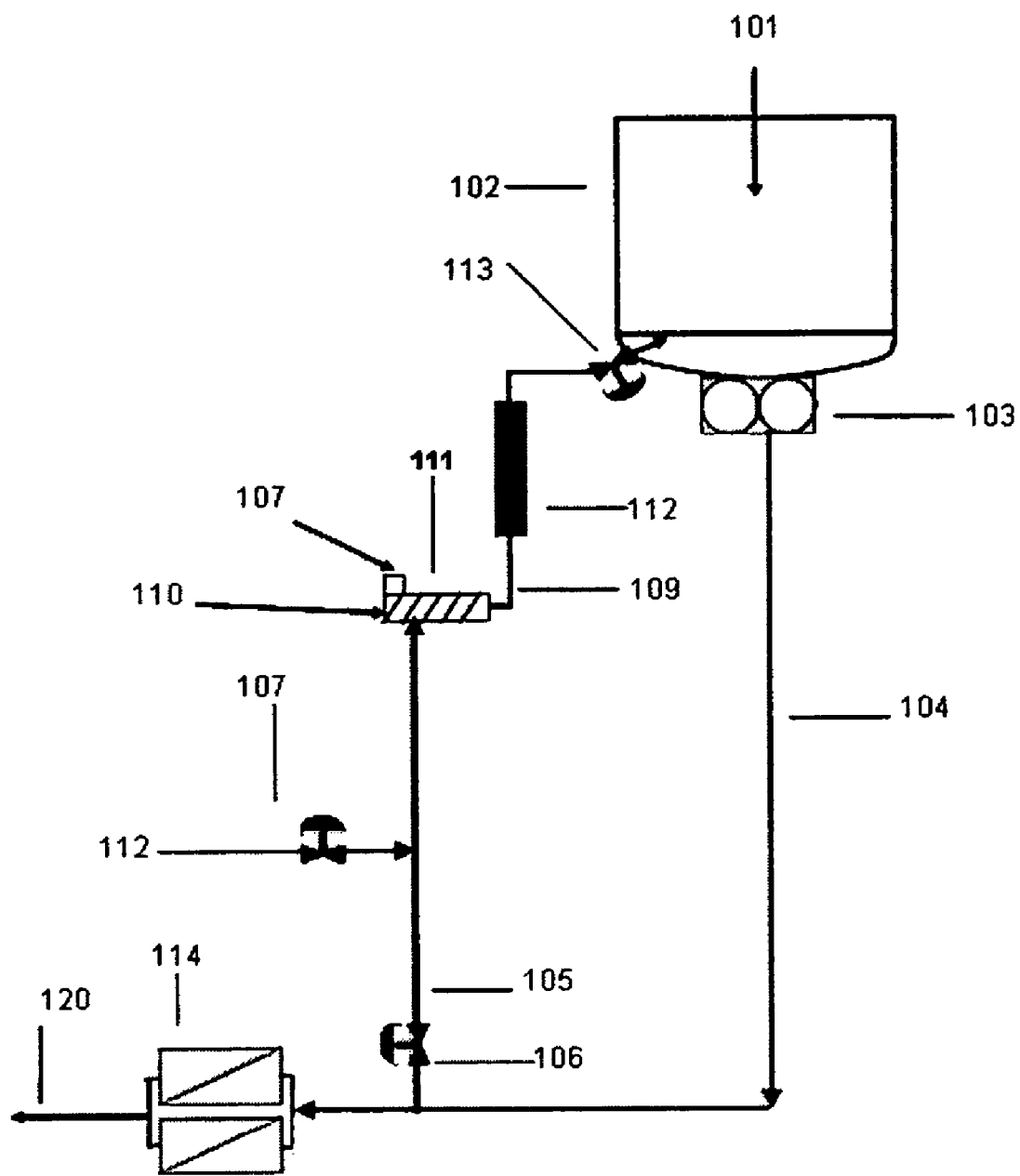
FIG. 3 is a process flow diagram illustrating a slipstream to which is fed a compositional modifier and another additive.

The present invention may be understood more readily by reference to the following detailed description and by reference to FIGS. 1-3 as an illustration of three embodiments, with other embodiments described herein in further detail.

Before the present processes are disclosed and described, it is to be understood that this invention is not limited to specific synthetic methods or to particular formulation, as such may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise. For example, reference to processing or making a "polymer", a "preform", "article", "container", or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" or "having" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" means that each listed ingredient is present in the composition, and does not imply that any ingredient in the composition is unbound or unreacted. The composition may be solid or liquid. The stated ingredients in the composition may be bound, unbound, reacted, unreacted, and unless otherwise specified, in any oxidation state.

The intrinsic viscosity (It.V.) values described throughout this description are set forth in dL/g unit as calculated from the inherent viscosity (Ih.V.) measured at 25° C. in 60/40 wt/wt phenol/tetrachloroethane. Polymer samples are dissolved in the solvent at a concentration of 0.25 g/50 mL. The viscosity of the polymer solution is determined using a Viscotek Modified Differential Viscometer. A description of the operating principles of the differential viscometers can be found in ASTM D 5225. The inherent viscosity is calculated from the measured solution viscosity. The following equations describe these solution viscosity measurements, and subsequent calculations to Ih.V. and from Ih.V. to It.V:

$$\eta_{inh} = [\ln(t_s/t_o)]/C$$

where
  $\eta_{inh}$=Inherent viscosity at 25° C. at a polymer concentration of 0.50 g/100 mL of 60% phenol and 40% 1,1,2,2-tetrachloroethane
  ln=Natural logarithm
  $t_s$=Sample flow time through a capillary tube
  $t_o$=Solvent-blank flow time through a capillary tube
  C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0} \ln(\eta_r/C)$$

where
  $\eta_{int}$=Intrinsic viscosity
  $\eta_r$=Relative viscosity=$t_s/t_o$
  $\eta_{sp}$=Specific viscosity=$\eta_r - 1$ Instrument calibration involves replicate testing of a standard reference material and then applying appropriate mathematical equations to produce the "accepted" Ih.V. values.

Calibration Factor=Accepted Ih.V. of Reference Material/Average of Replicate Determinations Corrected Ih.V.=Calculated Ih.V.×Calibration Factor The intrinsic viscosity (It.V. or $\eta_{int}$) may be estimated using the Billmeyer equation as follows:

$$\eta_{int} = 0.5[e^{0.5 \times Corrected\, Ih.V.} - 1] + (0.75 \times Corrected\, Ih.V.)$$

The reference for calculating intrinsic viscosity (Billmeyer relationship) is *J. Polymer Sci.*, 4, 83-86 (1949).

Alternatively, the It.V can be measured using the above solvents and concentrations measured according to ASTM D 5225-98 using a differential viscometer to measure IV.

In one embodiment of the present invention, a process is disclosed for preparing a modified polymer by:
  a) discharging from a polymerization reactor a polycondensed polymer melt to form a continuously discharged polymer melt stream,
  b) withdrawing a portion of the polymer melt from the continuously discharged polymer melt stream to form a slipstream,
  c) introducing a compositional modifier into the slipstream to form a modifier containing slipstream, and
  d) introducing the modifier containing slipstream to a location upstream from the point of withdrawing the polymer melt from the discharged polymer melt stream in step b).

In another embodiment of the present invention, a process is disclosed for preparing a series of modified polymers with varying levels of blockiness. By blockiness, it is meant that section of molecular chains containing consecutive monomers derived from the compositional modifier are incorporated into the polymer chains of the polycondensed polymer melt produced by the process of the continuous polymerization reactor to yield a block copolymer. Not being bound by any theory, the extent of blockiness is believed to be controlled by the time duration the compositional modifier interacts with the polycondensed polymer melt while exposed to a melt phase temperature. By selecting an appropriate point to introduce the modifier containing slipstream into the polymerization process producing the polycondensed polymer melt, the time duration at the melt phase temperatures can be adjusted. Particularly suited for the compositional modifier of the present invention are condensation type polymers as they are capable of undergoing transesterification reactions with a polyester polycondensed polymer melt during exposure to melt processing to form a block modified polymer. Condensation type polymers useful as the compositional modifier in the present invention include polyesters, polycarbonates, and polyamides. The extent of transesterification can be determined by nuclear magnetic resonance (NMR).

In yet another embodiment of the present invention, a process is disclosed for preparing a series of modified polymers of varying comonomer compositions wherein the modified polymer is a random copolymer. By random copolymer is meant each polymer chain of the modified polymer contains monomers derived from both the compositional modifier and the polycondensed polymer melt produced by the continuous polymerization reactor and further, it is meant these monomers are randomly arranged in the modified polymer chain. Particularly suited for both the compositional modifier and the polycondensed polymer melt are polyester type condensation polymers as they readily undergo transesterification reactions during exposure to melt processing temperature to form a random copolyester modified polymer.

The melt phase process is suitable for continuously polycondensing a polymer thereby providing a discharged polymer melt stream. The polycondensed polymer melt is in a liquid or molten state and is suitable for receiving an additive. Examples of such polycondensed polymer melts are thermoplastic polymers, preferably polyesters.

A polycondensed polymer melt contains any unit-type of polyester including but not limited to homopolyesters, copolyesters, and terpolyesters and is understood to mean a synthetic polymer prepared by the reaction of one or more difunctional carboxylic acids with one or more difunctional hydroxyl compounds. Typically the difunctional carboxylic acid can be a dicarboxylic acid and the difunctional hydroxyl compound can be a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The polycondensed polyester polymer is desirably a random polymer such that the monomer units in the polymer chain are randomly arranged rather than arranged in a block fashion.

Preferred polycondensed polyester polymers contain repeating alkylene aryl units, such as alkylene terephthalate or alkylene naphthalate repeat units in the polymer chain.

More specific examples of these repeating units include ethylene terephthalate, ethylene naphthalate, and trimethylene terephthalate. More preferred are polyester polymers which comprise:

(i) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and (ii) a hydroxyl component comprising at least 80 mole % of the residues of ethylene glycol and 0 to 20 mole percent of either 1,4-cyclohexanedimethanol units, diethylene glycol units, 2,2,4,4-tetramethyl-1,3-cyclobutanediol units, modifying glycol units having 2 to 16 carbons, or mixtures thereof, based on 100 mole percent of carboxylic acid component residues and 100 mole percent of hydroxyl component residues in the polyester polymer.

Typically, polycondensed polyester polymers such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product, sum to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polycondensed polyester polymer. All the compounds that enter the process containing hydroxyl group(s) or derivatives thereof that become part of said polyester product(s) comprise the hydroxyl component. The mole % of all the compounds containing hydroxyl group(s) or derivatives thereof that become part of said polyester product(s) sum to 100. The "residues" of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the carboxylic acid residues and the hydroxyl residues in the product(s) can be determined by proton NMR.

The reaction of the carboxylic acid component with the hydroxyl component during the preparation of the polycondensed polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polycondensed polyester polymer may include one or more additional carboxylic acid modifier components. Such additional carboxylic acid modifier components include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polycondensed polyester polymer, along with monocarboxylic acid chain terminators.

In addition to a hydroxyl component comprising ethylene glycol, the hydroxyl component of the present polycondensed polyester polymer may include additional glycol modifier components. Such additional glycol modifier components include mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As carboxylic acid modifier residues, the polycondensed polyester polymer may contain isophthalic acid and naphthalane dicarboxylic acid Carboxylic acid modifiers residues and glycol modifier residues can both be present in amounts of up to 20 mole %, or up to 10 mole %, or up to 5 mole %, or up to 3 mole %, or up to 2 mole %, based on the total moles of their respective component in the polycondensed polyester polymer. Mono, tri and higher functional modifiers are preferably present in amounts of only up to about 8 mole %, or up to 4 mole %.

The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

The polycondensed polymer melt of the present invention may also include suitable additives normally used in polymers. Such additives may be employed in conventional amounts and may be added directly to the reaction forming the matrix polymer. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, plasticizers, nucleators, mold release agents, compatibilizers, processing aids and the like, or their combinations. These additives may be introduced into paste tank, the esterification ractor, the prepolymerization reactor, the finishing reactor, and at any point in between. In addition, the polycondensed polymer melt may also contain compositional modifier and additives previously introduced into the polycondensation reactor via the modifier containing slipstream.

All of these additives and many others and their use are known in the art and do not require extensive discussion. Therefore, only a limited number will be referred to, it being understood that any of these compounds can be used in any combination so long as they do not hinder the present invention from accomplishing its objects.

To the polycondensed polymer melt, either in a prepolymerization reactor, the final polycondensation reactor, or at any point before withdrawing slipstream, a modifier containing slipstream is added. The modifier containing slipstream contains a compositional modifier.

The "compositional modifiers" useful according to the present invention are condensation type polymers, preferably polyamides, polycarbonates, and polyesters. One embodiment of this invention is a process to introduce a polyamide compositional modifier into a polycondensed polymer melt of PET, for example, to enhance the barrier performance of the PET. Another embodiment is a process to produce a modified polymer wherein a polycarbonate modifying polymer is admixed into the polycondensed polyester polymer to, for example, produce a modified polyester with enhanced glass transition temperature ($T_g$) and corresponding increased maximum use temperature. Still another embodiment is a process whereby a compositional modifier such as a copolyester comprising a high comonomer content is introduced into a polycondensed polyester polymer melt stream of PET homopolymer thereby providing a modified polymer of intermediate comonomer content to each of the individual polyester feeds.

By "compositional modifier" we mean a condensation polymer that contains either a greater or lesser mole percent of diacid resides other than terephthalic acid residues as present in the continuously produced polymer melt or that contains a greater or lesser mole percent of hydroxyl residues other than EG residues as present in the continuously produced polymer melt. In addition, the modifying polymer may contain a monomer residue not present in the polycondensed polymer melt stream. For example, a modified polymer comprising 6 mole percent cyclohexandimethanol (CHDM) residue may be produced by adding a PET compositional modifier comprising greater than 6 mole percent CHDM residue, or greater than 10 mole percent CHDM residue, or greater than 25 mole percent CHDM, or greater than 50 mole percent CHDM, or greater than 75 mole percent CHDM, or up to 100 mole percent CHDM to a polycondensed polyester polymer melt comprising less than 6 mole percent CHDM glycol modifier residue. In another example, a modified polymer comprising CHDM residue may be produced by adding a PET compositional modifier comprising greater than 6 mole percent CHDM residue, or greater than 10 mole percent CHDM residue, or greater than 25 mole percent CHDM, or greater than 50 mole percent CHDM, or greater than 75 mole percent CHDM, or up to 100 mole percent CHDM to a polycondensed PET polymer melt stream comprising 2 mole percent CHDM glycol modifier residue. In yet another example, a modified polymer comprising CHDM residue may be produced by adding a PET compositional modifier comprising greater than 6 mole percent CHDM residue, or greater than 10 mole percent CHDM residue, or greater than 25 mole percent CHDM, or greater than 50 mole percent CHDM, or greater than 75 mole percent CHDM, or up to 100 mole percent CHDM to a polycondensed PET homopolymer polymer melt comprising neither dicarboxylic acid modifier or glycol modifier residues. In still another example, a modified polymer comprising isophthalic acid (IPA) residue may be produced by adding a PET compositional modifier comprising greater than 6 mole percent IPA residue, or greater than 10 mole percent IPA residue, or greater than 25 mole percent IPA, or greater than 50 mole percent IPA, or greater than 75 mole percent IPA, or up to 100 mole percent IPA to a polycondensed unmodified-PET polymer melt stream comprising neither dicarboxylic acid modifier or glycol modifier residues. In another example, a modified polymer comprising 6 mole percent isophthalic acid (IPA) residue may be produced by adding a PET compositional modifier comprising greater than 6 mole percent IPA residue, or greater than 10 mole percent IPA residue, or greater than 25 mole percent IPA, or greater than 50 mole percent IPA, or greater than 75 mole percent IPA, or up to 100 mole percent IPA to a polycondensed polyester polymer melt comprising less than 6 mole percent IPA glycol modifier residue. In another example, a modified polymer comprising 6 mole percent naphthalic dicarboxylic acid (NDA) residue may be produced by adding a PET compositional modifier comprising greater than 6 mole percent NDA residue, or greater than 10 mole percent NDA residue, or greater than 25 mole percent NDA, or greater than 50 mole percent NDA, or greater than 75 mole percent NDA, or up to 100 mole percent NDA to a polycondensed polyester polymer melt comprising less than 6 mole percent NDA. In another example, a modified polymer comprising 2,4-dihydroxy-1,1,3,3-tetramethyl-cyclobutane (TMCB) residue may be produced by adding a PET compositional modifier comprising greater than 6 mole percent TMCB residue, or greater than 10 mole percent TMCB residue, or greater than 25 mole percent TMCB, or greater than 50 mole percent TMCB, or greater than 75 mole percent TMCB, or up to 100 mole percent TMCB to a polycondensed polyester polymer melt. Likewise, a modified polymer comprising dicarboxylic acid modifier and glycol modifier residues may be produced by adding a PET compositional modifier comprising greater than 6 mole percent IPA residue, or greater than 10 mole percent IPA residue, or greater than 25 mole percent IPA, or greater than 50 mole percent IPA, or greater than 75 mole percent IPA, or up to 100 mole percent IPA to a polycondensed polyester polymer melt comprising greater than 1 mole percent CHDM residue, or greater than 10 mole percent CHDM residue, or greater than 25 mole percent CHDM, or greater than 50 mole percent CHDM, or greater than 75 mole percent CHDM, or up to 100 mole percent CHDM. Likewise, the dicarboxylic acid modifier and glycol modifier residues of the modified polymer may be reduced relative to the polycondensed polyester polymer, this reduction being achieved by adding a compositional modifier containing less dicarboxylic acid modifier and glycol modifier residues than the polycondensed polyester polymer to which the compositional modifier is introduced. An example of such a dicarboxylic acid modifier and glycol modifier reduction is a modified polymer comprising less than 6 mole percent isophthalic acid (IPA) residue may be produced by adding a PET compositional modifier comprising less than 6 mole percent IPA residue, or less than 4 mole percent IPA residue, or less than 2 mole percent IPA, or 0 mole percent IPA to a polycondensed polyester polymer melt comprising 6 or greater mole percent IPA glycol modifier residue. These examples are exemplary and are not restrictive of the invention, as claimed and are intended to demonstrate the utility of the present invention to prepare a family of copolymers comprising a variety of comonomer residues in varying mole percent incorporation.

Suitable polyamide compositional modifiers include partially aromatic polyamides, aliphatic polyamides, wholly aromatic polyamides and mixtures and copolymers thereof which are derived from diamines and dicarboxylic acids and/or from aminocarboxylic acids or their corresponding lactams. By "partially aromatic polyamide" it is meant that the amide linkage of the partially aromatic polyamide contains at least one aromatic ring and a nonaromatic species.

The polyamides are generally prepared by processes which are well known in the art. A typical procedure is by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80° C. to 120° C., until the ester is converted to an amide. The mixture is then heated to the polymerization temperature.

Suitable polyamides have a film forming molecular weight and preferably an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/1,1,2,2-tetrachloroethane at a concentration of 0.5 grams per 100 ml. Wholly aromatic polyamides comprise in the molecule chain at least 70 mole % of structural units derived from m-xylene diamine or a xylene diamine mixture comprising m-xylene diamine and up to 30% of p-xylene diamine and an .alpha.epsilon.-aliphatic dicarboxylic acid having 6 to 10 carbon atoms, which are further described in Japanese Patent Publications No. 1156/75, No. 5751175, No. 5735/75 and No. 10196/75 and Japanese Patent Application Laid-Open Specification No. 29697/75, the disclosure of which is incorporated herein by reference.

Polyamides formed from isophthalic acid, terephthalic acid, cyclohexanedicarboxylic acid, meta- or para-xylene diamine, 1,3- or 1,4-cyclohexanebis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Partially aromatic polyamides include: poly(m-xylene adipamide), poly(m-xylene adipamide-co-isophthalamide), poly(hexamethylene isophthalamide), poly(hexamethylene isophthalamide-co-terephthalamide), poly(hexamethylene adipamideco-isophthalamide), poly(hexamethylene adipamide-co-terephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and mixtures thereof.

Suitable aliphatic polyamides include polycapramide (nylon 6), poly-aminoheptanoic acid (nylon 7), poly-aminononanoic acid (nylon 9), polyundecane-amide (nylon 11), polylaurylactam (nylon 12), polyethylene-adipamide (nylon 2,6), polytetramethylene-adipamide (nylon 4,6), polytetramethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydecamethylene-adipamide (nylon 12,6) and polyhexamethylene-sebacamide (nylon 12,8).

Suitable polycarbonate compositional modifiers include the condensation product of a carbonate source and a diol source having a carbonate component containing 100 mole percent carbonate units and a diol component containing 100 mole percent diol units, for a total of 200 mole percent monomeric units. The term "diol" as used herein includes both aliphatic and aromatic compounds having two hydroxyl groups.

The polycarbonates may be prepared by a variety of conventional and well known processes which include transesterification, melt polymerization, and interfacial polymerization. The polycarbonates are generally prepared by reacting a dihydric phenol with a carbonate precursor, such as phosgene, a haloformate or carbonate ester in melt or solution. Suitable processes for preparing the polycarbonates of the present invention are described in U.S. Pat. Nos. 2,991,273; 2,999,846; 3,028,365; 3,153,008; 4,123,436; all of which are incorporated herein by reference.

The dihydric phenols employed are known, and the reactive groups are thought to be the phenolic hydroxyl groups. Typical of some of the dihydric phenols employed are bisphenols such as 2,2-bis-(4-hydroxyphenyl)-propane (bisphenol A), 3,3,5-trimethyl-1,1-bis(4-hydroxyphenyl)-cyclohexane, 2,4-bis-(4-hydroxyphenyl)-2-methyl-butane, 1,1-bis-(4-hydroxyphenyl)-cyclohexane,.alpha.,.alpha.'-bis-(4-hydroxyphenyl)-p-diisopropylbenzene, 2,2-bis-(3-methyl-4-hydroxyphenyl)-propane, 2,2-bis-(3-chloro-4-hydroxyphenyl)propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy benzophenone, 2,4-bis-(3,5-dimethyl-4-hydroxyphenyl)-cyclohexane, .alpha.,.alpha.'-bis-(3,5-dimethyl-4-hydroxyphenyl)-p-diisopropylbenzene and 4,4'-sulfonyl diphenol. Other dihydric phenols might include hydroquinone, resorcinol, bis-(hydroxyphenyl)-alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and .alpha.,.alpha.-bis-(hydroxyphenyl)diisopropylbenzenes, as well as their nuclear-alkylated compounds. These and further suitable dihydric phenols are described, for example, in U.S. Pat. Nos. 2,991,273; 2,999,835; 2,999,846; 3,028,365; 3,148,172; 3,153,008; 3,271,367; 4,982,014; 5,010,162 all incorporated herein by reference. The polycarbonates of the invention may entail in their structure, units derived from one or more of the suitable bisphenols.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The polycarbonates of this invention have a weight average molecular weight, as determined by gel permeation chromatography, of about 10,000 to 200,000 g/mol, preferably 15,000 to 80,000 g/mol and their melt flow index, per ASTM D-1238 at 300.degree. C is about 1 to 65 g/10 min, preferably about 2 to 30 g/10 min. The polycarbonates may be branched or unbranched. It is contemplated that the polycarbonate may have various known end groups. These resins are known and are readily available in commerce.

Suitable polyester compositional modifiers are those condensation type polyesters that when introduced into the polycondensed polyester polymer melt will either introduce one or more new monomer residues or will change the mole percent of the diacid residues or the glycol residues of the polycondensed polyester polymer to yield a modified polymer of intermediate comonomer content. The compositional modifier can be used to either lower or raise the carboxylic acid modifier residues or glycol, modifiers residues in the polycondensed polyester polymer. The monomer ratios in the modified polymer will depend on the relative comonomer content of the compositional modifier and the ratio of compositional modifier added to the polycondensed polyester polymer. The polymerizations methods described above to produce the polycondensed polyester polymer melt is also applicable to production of the polyester compositional modifier.

The polyester compositional modifier of the invention comprise polyesters that incorporate one or more of the carboxylic acid modifier residues and glycol modifiers residues such that the sum of the total modifier residue comprising the polyester compositional modifier is at least 0.1 mole %, or at least 1 mole %, or at least 5 mole %, or at least 10 mole %, or at least 25 mole %, or at least 50 mole %, or at least 75 mole %, or at least 100 mole %, up to about 125 mole %, or up to 150 mole %, or up to 200 mole % based on a total mole percent of 200 mole %, comprised of 100 mole % acid residues and 100 mole % glycol residues.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component of the polyester compositional modifier may be prepared using one or more additional carboxylic acid modifier components. Such additional carboxylic acid modifier components include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the polyester compositional modifier may be prepared using one or more additional glycol modifier components. Such additional glycol components include mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,2,4,4-tetramethyl-1,3-cyclobutanediol units; 2,2-bis-(3-hydroxyethoxyphenyl)-propane; and 2,2-bis-(4-hydroxypropoxyphenyl)-propane. As glycol modifier components, the polyester compositional modifier may preferably contain such comonomers as 1,4-cyclohexanedimethanol, 2,2,4,4-tetramethyl-1,3-cyclobutanediol units, and diethylene glycol.

To ensure introduction of the compositional modifier does not adversely affect the physical properties of the polycondensed polyester polymer, the polyester compositional modifier of the invention should have an It.V. of at least 0.45, or at least 0.50, or at least 0.55, or at least 0.60, or at least 0.65, or at least 0.70, as measured at 25° C. in a solvent consisting of 60 weight percent phenol and 40 weight percent tetrachloroethane.

The continuously discharged polymer melt stream may be supplied by any polymerization reactor utilized in the melt phase process for making polymers provided that a polymer melt is present. For condensation type polymers and polyesters in particular, the reactors are desirably polycondensation reactors, and they fall under a variety of one or more names, including a prepolymerization reactor, a prefinishing reactor, a first stage reactor, a second stage reactor, or a finishing reactor or their equivalents. Polycondensation is typically continued in one or more finishing vessels and generally, but not necessarily, ramped up to higher temperatures than present in the prepolymerization zone, to a value within a range of from 250° C. to 310° C., more generally from 270 to 300° C., until the It.V. of the melt is increased to a final desired It.V. The final vessel, generally known in the industry as the "high polymerizer," "finisher," or "polycondenser," is also usually operated at a pressure lower than used in the prepolymerization zone to further drive off the diol and/or other byproducts and increase the molecular weight of the polymer melt. The pressure in the finishing zone may be within the range of about 0.1 to 20 mm Hg, or 0.1 to 10 mm Hg, or 0.1 to 2 mm Hg. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically but not necessarily mechanically agitated to facilitate the removal of the diol and/or other byproducts. While reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. For example, the reactors may be one or more pipe reactors. Nor is it necessary to split the polycondensation reaction into a prepolymer zone and a finishing zone because the polycondensation reaction can take place on a continuum of slight variations in operating conditions over time in one polycondensation reactor or in a multitude of reactors in series, either in a batch, semi-batch, or a continuous process.

The polyester melt should have an It.V. of at least 0.2 dL/g, or at least 0.3 dL/g, or at least 0.4 dL/g, or at least 0.5 dL/g in the discharged polymer melt stream. Preferably, the polymer melt is discharged from the final reactor used in the melt phase process. More preferably, the polymer melt is discharged from the bottom or last stage of the final reactor in the melt phase process. As shown in FIG. 1, polycondensed polymer melt 101 is fed into a final finishing (or final polycondensation) reactor vessel 102 where polycondensation is continued, is discharged from the vessel as a continuously discharged polymer melt stream 104 through a gear pump 103 or other suitable motive force. In one embodiment, the polyester polymer in the continuously discharged polyester polymer melt stream has an It.V. of at least 0.60 dL/g, or at least 0.68 dL/g, or at least 0.72 dL/g, or at least 0.74 dL/g, or at least 0.76 dL/g.

After reaching the target It.V. in the final reactor, the continuously discharged polymer melt stream is withdrawn for the melt phase process as a modified polymer and ultimately solidified by any technique. The method for solidifying the modified polymer from the melt phase process is not limited. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers. For example, molten modified polymer from the may be directed through a die, or merely cut, or both directed through a die followed by cutting the molten modified polymer. A gear pump may be used as the motive force to drive the molten modified polymer through the die. Instead of using a gear pump, the molten modified polymer may be fed into a single or twin screw extruder and extruded through a die, optionally at a temperature of 190° C. or more at the extruder nozzle. Once through the die, the modified polymer can be drawn into strands, contacted with a cool fluid, and chopped into pellets, or the polymer can be pelletized at the die head, optionally underwater. The modified polymer is optionally filtered through filters 114 to remove particulates over a designated size before being cut.

The modified polymer is processed to a desired form, such as amorphous particles. The shape of the modified polymer particles is not limited, and can include regular or irregular shaped discrete particles without limitation on their dimensions, including stars, spheres, spheroids, globoids, cylindrically shaped pellets, conventional pellets, pastilles, and any other shape.

The invention can be further understood by reference to FIG. 1-3 and the description, each serving to illustrate one of the many embodiments within the scope of the invention. Other embodiments within the scope of the invention can be designed by reference to the description without departing form the spirit of scope of the invention.

As illustrated in FIG. 1, in step a) a continuously discharged polymer melt stream 101 is continuously discharged from a polymerization reactor 102 using a positive displacement pump 103 into discharge line 104. In step b), a portion of the continuously discharged polymer melt stream is withdrawn from the discharge line 104 and fed or diverted to form slipstream 105. The amount diverted can be regulated by a valve or other suitable means known in the art to regulate flows. A slipstream ram valve 106 is depicted to allow removal of a portion of the discharged polymer melt stream into the slipstream 105. If desired, one may employ an optional positive displacement pump for slipstream valve 106 to provide motive force driving the slipstream molten polymer back to the reactor or any other reactor upstream of the reactor from which the discharged polymer was taken.

In step c), a compositional modifier 107 is fed into the slipstream 105 to form a modifier containing slipstream 109. For example, as depicted in FIG. 1, compositional modifier 107 is first introduced into extruder 110, melted, and then fed into slipstream 105. Both single screw and twin screw extruders are applicable to this invention. Optionally, a gear pump 108 may be provided at the discharge of the extruder 110 to help regulate the compositional modifier throughput and to provide the necessary pressure for returning the slip stream polymer composition to the melt phase reactor. In another embodiment as depicted in FIG. 2, extruder 110 is configured in-line with slipstream 105 allowing the compositional modifier to be melted and blended with the slipstream within the high-mixing environment of the extruder; a twin screw extruder is preferable. The amount of compositional modifier used may be regulated by any loss-in-weight feeder commonly employed with twin screw extruders. In yet another embodiment of the invention, the compositional modifier 107 is fed directly, in a molten form, from second polymerization reactor to slipstream 105. The amount of modifying polymer used may be regulated by a regulator such as a ram valve, flow meter, or positive displacement pump.

Optionally in step c), an additive 112 can be introduced directly into the slipstream 105. In one embodiment, the additive 112 can be introduced into extruder 111 with the modifying polymer. In another embodiment, the additive can first be melt blended with a carrier resin to form a masterbatch, the carrier resin being preferably polyester and more preferably the composition of either the polycondensed polymer melt or the compositional modifier. In another embodiment as depicted in FIG. 3, the additive 112 is introduced into the slipstream prior to introduction of the modifying polymer. In yet another embodiment, the additive is introduced into the slip stream after the compositional modifier is introduced. In still another embodiment, both an optional liquid or solid additive composition can be fed into the slipstream at a first addition point, and downstream of the first addition point, a second additive composition can be fed into the line in a similar fashion; both additive addition points into the slip stream being independent of the addition point of the compositional modifier. Introduction point of the optional additive is dependent on a number of factors including thermal sensitivity of the additive, potential chemistries that can occur in the melt between the additive and other components in the melt, and desired level of mixing.

To facilitate introduction of the an additive directly into the slip stream, the additive injection nozzle (not depicted) should be of a design to prevent plugging. For example, the injection nozzle may have a nozzle portion which protrudes to the center line of the slipstream pipe. Preferably the exit of tip of the nozzle should protrude into the slipstream a distance of ⅓ the radius of the slip stream pipe into the high shear region of the slip steam flow. The opening in the tip of the nozzle is restricted to a diameter sufficiently small to prevent the slipstream molten polymer from entering the nozzle. The small restriction creates a pressure drop across the tip as the additive composition is injected into the slipstream molten polymer. When the ram valve is closed, a piston extension is inserted into the nozzle and extends through the nozzle tip preventing polymer from entering the nozzle.

The additive can be a liquid additive or a solid additive. An example of a liquid additive is a phosphorus based compound used to stabilize or deactivate polycondensation catalysts present in the discharged polymer melt stream. An example of a solid additive may include metal powders or dispersions used as reheat additives or slip agents, or barrier or scavenging material which optionally can be melted before feeding. Preferably, any solid additive is either added either directly into the extruder used to melt and introduce the modifying polymer or is first compounded into a similar or same type of polymer as made in the reactor to form a concentrate, and this concentrate is fed in molten form to the slipstream. The additive feed rate into the slipstream will depend on the desired concentration of the additive in the finished polymer melt stream 120 ready for solidification.

For example, a solid concentrate comprising an additive and a polyester polymer having an It.V. of at least 0.60 dL/g may be melted and pumped into the slipstream at a predefined rate corresponding the a predetermined concentration of additive in the discharged polymer melt stream. The feed rate will be determined by the concentration of the additives in the concentrate, the desired concentration of the additive in the discharged polymer melt stream, and the flow rate of the slipstream. The means by which the solid additive composition can be made and fed can very. For example, as mentioned above, pre-manufactured solid concentrate pellets containing a concentrated amount of additive may be fed to a single screw extruder, melted, and metered into the slipstream. Alternatively, one may compound and feed the neat additive into the slipstream in one step by introducing the additive directly into extruder 111 used to incorporate the compositional modifier.

Examples of additives that can be incorporated into the discharged polymer melt stream include crystallization aids, impact modifiers, surface lubricants, denesting agents, antioxidants, ultraviolet light absorbing agents, metal deactivators, colorants, nucleating agents, acetaldehyde reducing compounds, reheat rate enhancing aids, sticky bottle additives such as talc, and fillers, oxygen barrier materials and the like.

In another embodiment, optional additive is post consumer recycle polyester polymer ("PCR"). The PCR can be metered using a loss-in-weight feeder simultaneously into the extruder used to melted and introduce the modifying polymer into the slipstream. In this way, and convenient means is provided for both adding and blending or transesterifying PCR into virgin polyester polymer. In one embodiment, the final polymer composition contains at least 5 wt. % PCR, or at least 10 wt. % PCR, or at least 15 wt. % PCR. In another embodiment, scrap, waste, or reground virgin polyester polymer can be added into the slipstream such that the final polyester polymer composition also contains at least 0.5 wt. %, or at least 1 wt. %, or at least 5 wt. % of scrap, regrind, or waste polymer or even off-specification polymer.

The slipstream flow rates may be regulated by the pressure created in the continuously discharged polymer melt stream 104 by gear pump 103. Depicted in FIG. 1 is a pressure driven slipstream line 105. The slipstream flow rate may be determined by the concentration of additives used to feed the slipstream and the desired concentration of additives in the discharged polymer melt stream. The slip stream flow rate can vary from 2% to 50%, or 5% to 25% of the continuously discharged polymer melt rate depending on what type of additives are being added and the desired discharge melt stream additive concentration. In a pressure driven slipstream flow rate, the flow rate of the slipstream 105 will self balance by increasing the flow rate of the slipstream to accommodate pressure drops in the loop.

Alternatively, a flow meter installed in slipstream line 105 can be used to measure and adjust slipstream control valve 106 to vary the slipstream flow rate. As another alternative, a positive displacement pump can be installed in the slipstream line 105 to set a fixed or constant flow rate, optionally a pre-determined flow rate. The slipstream gear pump can act as both a pressure let-down device while controlling the flow rate. The control valve 106 need not be supplied if a gear pump is used in the slipstream take off line.

After the compositional modifier and optional additive are added into the slipstream, one may in some cases find it desirable to optionally employ a mixing device to obtain good mixing between the modifying polymer, optional additive, and the slipstream polymer melt, especially between dramatically different viscosity fluids or between solids and liquids. An in-line mixer may be employed in a pipe, or baffles or weirs may be employed, or as depicted in FIG. 1, a static mixer 112 may be employed. The type of mixing device used in not limited.

At any point along the slip stream, heat can either be added or removed from the polymer melt in the slipstream. Examples where temperature regulation is needed include the addition of thermally sensitive optional additives, to improve the mixing characteristics of the modifying polymer and optional additives with the polymer melt in the slipstream, and in cases where endothermic or exothermic reactions occur between the modifying polymer, optional additives, and polymer melt in the slip stream.

In the event the additive used is corrosive, the metallurgy of the piping, mixers, valves, and pumps may be a HASTELLOY alloy or titanium or other suitable corrosion resistant material. Alternatively, a corrosion resistant silver coating or liner may be employed to protect the corrosion susceptible materials.

Once the compositional modifier and optional additives have been added into the slipstream line 105 to form a modifier containing slipstream, the modifier containing slipstream is fed in a step d) to a location upstream from the feed location forming the slipstream. This would include feeding the modifier containing slipstream to line 104 prior to the takeoff point of slipstream 105, to the entry of a gear pump 103, to the reactor 102 from which the polycondensed polymer melt was discharged, or to a pipe or reactor upstream of the final reactor 102. As depicted in FIG. 1, the modifier containing slipstream is fed back to the reactor 102 through a ram valve 113. Optionally, the modifier containing slipstream may have been well mixed through a mixer such as a static mixer 112.

Desirably, the modifier containing slipstream is fed to the bottom of the reactor 102. In this way, the modifier containing slipstream is added late in the process after substantial completion of polycondensation, which is when one or more of the following conditions are satisfied or thereafter and before solidification of the polyester melt:

a) the polyester melt reaches an It.V. of at least 0.50 dL/g or
b) vacuum applied to the polyester melt, if any, is released, or
c) if the polyester melt is present in a melt phase polymerization process, adding the additive within a final reactor for making the polyester polymer or between the final reactor and the take off point for forming a slipstream, or
d) if the polyester melt is present in a melt phase polymerization process, following at least 85% of the time for polycondensing the polyester melt; or
e) the It.V. of the polyester melt is within ±0.05 dl/g of the highest It.V. obtained prior to solidification; or
f) at a point within 20 minutes or less prior to solidifying the polyester.

Beyond the take off point to the slipstream 105, the discharged modified polymer is fed to a solidification device (not depicted) and optionally fed through filters 114.

The process is a continuous recirculation loop such that in operation in a steady state, the slipstream polymer melt 105 will already contain some amount of compositional modifier and optional additive, with additional amounts of compositional modifier and optional additive injected into the slipstream line to form an enriched modifier containing slipstream relative to the concentration of compositional modifier and optional additive in the slipstream prior to the additive addition point.

By the method of the invention, one may effect more rapid compositional changes during product transitions with generation of less off-class material in the production of copolymers by melt phase polymerization, particularly in relation to large-scale, continuous plants designed to produce such polyesters. Additionally, there is provided a method for adding a modifying polymer to a polyester polymer melt stream in a manner which allows time for good mixing and chemical equilibration. The method also allows for late addition of optional additives thereby minimizing thermal degradation of the additive, permitting and which are also well mixed into the final polymer melt.

The polyester polymer compositions of the invention are particularly useful to make stretch blow molded bottles, extrusion blow molded bottles, bottle preforms, fibers for carpet or apparel or stuffing, sheets, films, trays, cosmetic bottles and trays, or pharmaceuticals bottles and trays.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publication noted above are incorporated herein by reference for any disclosure pertinent to the practice of this invention.

We claim:

1. A process for preparing a modified polymer comprising:
a) discharging from a polymerization reactor a polycondensed polymer melt to form a continuously discharged polymer melt stream,
b) withdrawing a portion equal to between 2% and 50% of the polymer melt from the continuously discharged polymer melt stream to form a slipstream,
c) introducing a compositional modifier into the slipstream to form a modifier containing slipstream, and
d) introducing the modifier containing slipstream to a location upstream from the point of withdrawing the polymer melt from the discharged polymer melt stream in step b).

2. The process of claim 1 wherein the polycondensed polymer melt is a polyester or a copolyester.

3. The process of claim 2 wherein the polycondensed polymer melt comprises:
(i) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
(ii) a hydroxyl component comprising at least 80 mole % of the residues of ethylene glycol and 0 to 20 mole percent of residues selected from 1,4-cyclohexanedimethanol units, diethylene glycol units, 2,2,4,4-tetramethyl-1,3-cyclobutanediol units, modifying glycol units having 2 to 16 carbons, or mixtures thereof,
based on 100 mole percent of carboxylic acid component residues and 100 mole percent of hydroxyl component residues in the polyester polymer;
wherein the continuously discharged polymer melt stream has an inherent viscosity of 0.50 to 1.2 dL/g, measured at 25° C. in a solvent consisting of 60 weight percent phenol and 40 weight percent tetrachloroethane.

4. The process of claim 3 comprising 0 to 20 mole % dicarboxylic acid residues selected from the group consisting of isophthalic acid, phthalic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and mixtures thereof.

5. The process of claim 3 comprising 0 to 20 mole % isophthalic acid residues.

6. The process of claim 3 comprising greater than 0 to 20 mole % glycol residues selected from the group consisting of 1,4-cyclohexanedimethanol, diethylene glycol, 2,2,4,4-tetramethyl-1,3-cyclobutanediol, and mixtures thereof.

7. The process of claim 3 wherein the polymer melt stream is a polyester comprising an additive, said additive comprising a UV absorber, reheat rate enhancer, oxygen scavenger, acetaldehyde reducing agent, catalyst deactivator, or a combination thereof.

8. The process of claim 3 wherein an acetaldehyde reducing agent is not present in the polymer melt stream.

9. The process of claim 1 wherein the compositional modifier polymer comprises a condensation polymer.

10. The process of claim 9 wherein the compositional modifier comprises a polyamide, polycarbonate, or polyester.

11. The process of claim 10 wherein the compositional modifier is introduced into the slipstream at a rate sufficient to incorporate 0.1 weight % to 10 weight % of the polyamide in the discharged discharge polymer melt stream.

12. The process of claim 10 wherein the compositional modifier is introduced into the slipstream at a rate sufficient to incorporate 0.1 weight % to 50 weight % of the polycarbonate in the discharged polymer melt stream.

13. The process of claim 9 wherein the compositional modifier comprises polyester.

14. The process of claim 13 wherein the polyester comprises 0.1-100 mole % carboxylic acid modifying residues or 0.1 to 100 mole % glycol modifying residues.

15. The process of claim 14 wherein the carboxylic acid modifying residues comprise aromatic dicarboxylic acids having 8 to 14 carbon atoms, aliphatic dicarboxylic acids having 4 to 12 carbon atoms, or cycloaliphatic dicarboxylic acids having 8 to 12 carbon atoms.

16. The process of claim 14 wherein the carboxylic acid modifying residues comprise phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, or mixtures thereof.

17. The process of claim 14 wherein the carboxylic acid modifying residues comprise isophthalic acid, naphthalene-2,6-dicarboxylic acid, cyclohexane-1,4-dicarboxylic acid, or mixtures thereof.

18. The process of claim 14 wherein the glycol modifying residues comprise cycloaliphatic diols having 6 to 20 carbon atoms or aliphatic diols having 3 to 20 carbon atoms.

19. The process of claim 14 wherein the glycol modifying residues comprise diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; 2,2-bis-(4-hydroxypropoxyphenyl)-propane, or mixtures thereof.

20. The process of claim 14 wherein the glycol modifying residues comprise 1,4-cyclohexanedimethanol; 2,2,4,4-tetramethyl-1,3-cyclobutanediol, diethylene glycol, or mixtures thereof.

21. The process of claim 14 wherein the compositional modifier exhibits an intrinsic viscosity greater than 0.45 dL/g, measured at 25° C. in a solvent consisting of 60 weight percent phenol and 40 weight percent tetrachloroethane.

22. The process of claim 1 wherein a control valve regulates the flow rate of the polymer melt passing through the slipstream.

23. The process of claim 1 wherein a melt pump is incorporated into the slipstream to regulate the flow rate of the polymer melt passing through the slipstream.

24. The process of claim 1 wherein a flow meter is incorporated into the slipstream to regulate the flow rate of the polymer melt passing through the slipstream.

25. The process of claim 1 wherein the portion equals between 5% to 25%.

26. The process of claim 1 wherein the temperature of the slipstream is set to within 10° C. of the temperature of the compositional modifier.

27. The process of claim 1 wherein the temperature of the modifier containing slipstream is set to a temperature differential no greater than 10° C. relative to the temperature of the continuously discharged polymer melt stream.

28. The process of claim 1 wherein the compositional modifier is introduced into an extruder, melted, and then pumped into the slipstream to produce the modifier containing slipstream.

29. The process of claim 1 wherein both the compositional modifier and the polymer melt from the slipstream are introduced into an extruder located in-line with the slipstream and melt blended.

30. The process of claim 1 wherein the compositional modifier is supplied as a continuous flow of polymer melt from a second polymerization reactor and is injected directly into the polymer melt of the slipstream using a melt pump or in-line extruder.

31. The process of claim 1 wherein an additive is fed into an extruder with the compositional modifier and introduced to the slipstream.

32. The process of claim 31 wherein the additive is fed into the extruder as a masterbatch with the compositional modifier and introduced to the slipstream.

33. The process of claim 1 wherein an additive masterbatch is melted and pumped into the slipstream.

34. The process of claim 32 wherein the additive masterbatch comprises a polyester carrier resin having an It.V. of at least 0.6 dL/g.

35. The process of claim 1 wherein an additive can optionally be injected into the slipstream using a pump, either as a liquid or slurry.

36. The process of claim 1 wherein an additive is injected into the slipstream prior to introduction of the compositional modifier.

37. The process of claim 1 wherein an additive is injected into the slipstream subsequent to introduction of the compositional modifier.

38. The process of claim 1 wherein a first additive is fed into the slipstream at a first addition point and a second additive is fed into the slipstream downstream of the first addition point.

39. The process of any one of claims 31-38 wherein said additive comprises a UV absorber, reheat rate enhancer, oxygen scavenger, acetaldehyde reducing agent, catalyst deactivator, or a combination thereof.

40. The process of claim 1 wherein a post-consumer recycle polyester polymer is added to the slipstream.

41. The process of claim 1, comprising a static mixer in-line with the slipstream subsequent to the point where the compositional modifier is added to the slipstream.

42. The process of claim 1, comprising a static mixer in-line with the slipstream subsequent to the point where a first additive is added to the slipstream.

43. The process of claim 1 wherein the metallurgy of the piping, mixers, valves, and pumps comprising the slipstream comprises HASTELLOY alloy or titanium.

44. The process of claim 1 wherein the modifier containing slipstream is fed into the polymerization reactor at a location upstream from the feed location forming the slipstream.

45. The process of claim 1 wherein the modifier containing slipstream is fed to a location between the polymerization reactor and the take off point for forming the slipstream.

46. The process of claim 1, wherein the modifier containing slipstream is fed to a point within a final reactor for polycondensation and before solidification of the polymer melt stream.

47. The process of claim 1 wherein the modifier containing slipstream is fed into a polycondensation finishing reactor within a final reactor series or into a reactor pipe connecting the final reactor series upstream of a final reactor.

48. The process of claim 1 wherein the modifier containing slipstream is fed to a point after at least 85% of the time for polycondensing the polymer melt.

49. The process of claim 1 wherein the modifier containing slipstream is fed to the polyester melt stream after the It.V. of the polyester melt is within +/−0.1 dL/g of the highest It.V. obtained prior to solidification.

50. The process of claim 1 wherein the modifier containing slipstream is fed into the reactor at a point within 20 minutes or less prior to solidifying the polycondensed polymer melt.

51. An article obtained by feeding the modified polymer of claim 1 to a melt processing zone of an extruder and forming an article from the polymer melt, wherein said melt has an It.V. of at least 0.72 dL/g.

52. An article obtained by feeding pellets of the modified polymer produced by the process of claim 1 to a melt processing zone of an extruder, melting the pellets to form a polymer melt, and forming an article from the modified polymer, wherein said pellets have an It.V. of at least 0.72 dL/g.

53. The process of claim 1 in which a static mixer is installed before or after the slipstream is removed in the continuously discharged polymer melt stream.

* * * * *